＝

US007318607B2

(12) United States Patent
Clute

(10) Patent No.: US 7,318,607 B2
(45) Date of Patent: Jan. 15, 2008

(54) ADAPTIVE RESTRAINT SYSTEM WITH RETRACTOR PRETENSIONER

(75) Inventor: Günter Clute, Bloomfield Hills, MI (US)

(73) Assignee: Autoliv ASP, Inc., Ogden, UT (US)

( * ) Notice: Subject to any disclaimer, the term of this patent is extended or adjusted under 35 U.S.C. 154(b) by 421 days.

(21) Appl. No.: 10/968,504

(22) Filed: Oct. 19, 2004

(65) Prior Publication Data
US 2006/0082126 A1  Apr. 20, 2006

(51) Int. Cl.
*B60R 22/36* (2006.01)
(52) U.S. Cl. ..................................... 280/806
(58) Field of Classification Search .............. 280/806, 280/807, 808; 180/268; 701/45
See application file for complete search history.

(56) References Cited

U.S. PATENT DOCUMENTS

| | | | |
|---|---|---|---|
| 5,344,095 A | | 9/1994 | Frei |
| 5,413,378 A | * | 5/1995 | Steffens et al. .............. 280/735 |
| 5,415,431 A | | 5/1995 | Omura |
| 5,667,246 A | * | 9/1997 | Miller, III ..................... 280/806 |
| 5,788,281 A | * | 8/1998 | Yanagi et al. ................ 280/806 |
| 5,799,893 A | * | 9/1998 | Miller et al. .............. 242/379.1 |
| 5,881,962 A | | 3/1999 | Schmidt et al. |
| 5,938,135 A | | 8/1999 | Sasaki et al. |
| 6,012,667 A | * | 1/2000 | Clancy et al. ............ 242/379.1 |
| 6,105,894 A | | 8/2000 | Singer et al. |
| 6,213,510 B1 | * | 4/2001 | Suyama ....................... 280/805 |
| 6,290,159 B1 | * | 9/2001 | Specht et al. ............ 242/379.1 |
| 6,513,616 B2 | * | 2/2003 | Bacher et al. ............... 180/268 |
| 6,592,064 B2 | | 7/2003 | Clute et al. |
| 6,616,081 B1 | * | 9/2003 | Clute et al. .............. 242/379.1 |
| 6,616,186 B1 | | 9/2003 | Midorikawa et al. |
| 6,626,463 B1 | * | 9/2003 | Arima et al. ................ 280/806 |
| 6,641,075 B2 | | 11/2003 | Specht |
| 6,648,260 B2 | * | 11/2003 | Webber et al. ........... 242/379.1 |
| 6,659,505 B1 | | 12/2003 | Knox |
| 6,659,549 B1 | | 12/2003 | Still et al. |
| 6,702,326 B1 | | 3/2004 | Fujii |
| 6,719,325 B2 | * | 4/2004 | Ingemarsson ............... 280/735 |
| 6,726,250 B2 | | 4/2004 | Ennerdal |
| 6,729,649 B1 | | 5/2004 | Schmidt |
| 6,729,693 B2 | | 5/2004 | Soderstrom et al. |

(Continued)

FOREIGN PATENT DOCUMENTS

DE 10122910 B4 10/2004

(Continued)

*Primary Examiner*—Paul N. Dickson
*Assistant Examiner*—Karen J Amores
(74) *Attorney, Agent, or Firm*—Sally J Brown; Brinks Hofer Gilson & Lione

(57) ABSTRACT

A restraint system and method is adaptive to the size of the occupant, and adapts both pretensioning and load limitation characteristics to the occupant. The adaptive restraint system generally includes a retractor, a belt anchorage pretensioner, and a retractor pretensioner. The system is operable in at least a first mode and a second mode. In the first mode, both the belt anchorage pretensioner and the retractor pretensioner are activated when the occupant is estimated to be above a predetermined size, thereby providing a first load limitation characteristic. In the second mode, only the belt anchorage pretensioner is activated when the occupant is estimated to be at or below the predetermined size, thereby providing a second load limitation characteristic.

19 Claims, 4 Drawing Sheets

U.S. PATENT DOCUMENTS

| | | |
|---|---|---|
| 6,749,225 B1 | 6/2004 | Clute et al. |
| 7,128,343 B2 * | 10/2006 | Ingemarsson ............... 280/805 |
| 7,140,641 B2 * | 11/2006 | Ingemarsson et al. ...... 280/805 |
| 2001/0040065 A1 * | 11/2001 | Takagi et al. ............... 180/274 |
| 2002/0149191 A1 * | 10/2002 | Nishizawa .................. 280/806 |
| 2002/0166914 A1 | 11/2002 | Specht |
| 2003/0024326 A1 * | 2/2003 | Blakesley et al. ..... 73/862.391 |
| 2004/0021029 A1 | 2/2004 | Eberle et al. |
| 2006/0082126 A1 * | 4/2006 | Clute ......................... 280/806 |

FOREIGN PATENT DOCUMENTS

| | | |
|---|---|---|
| EP | 1415872 A1 | 6/2004 |
| WO | WO 03/082640 A1 | 10/2003 |
| WO | WO 2004/065181 A1 | 5/2004 |

* cited by examiner

ADAPTIVE RESTRAINT SYSTEM WITH RETRACTOR PRETENSIONER

FIELD OF THE INVENTION

The present invention relates generally to a seat belt restraint system for restraining an occupant of an automobile, and more particularly relates to adapting the restraint system to differently sized occupants.

BACKGROUND OF THE INVENTION

Seat belt restraint systems for automobiles often include a pretensioner which is structured to apply tension to the seat belt when an accident situation or a potential accident situation is detected. When the pretensioner is activated, the pretensioner eliminates any slack in the seat belt, and thus controls the physical space between the occupant and the seat belt. In this manner, the occupant of the seat is pulled tightly into the seat before a situation arises in which the occupant moves forwardly relative to the seat, thereby controllably restraining the occupant, reducing occupant excursion, and preventing undue loads when the occupant moves forwardly into the seat belt.

A retractor is another standard component of a seat belt restraint system which includes a spindle receiving the webbing material of the seat belt. The spindle is used to wind up and store the webbing. Generally, the spindle is locked in place upon detection at a potential accident situation in order to restrain the occupant via the seat belt. Recently, retractors have been designed having one or more force limiting elements which are structured to allow the spindle to rotate and pay out the webbing material of the seat belt upon reaching predetermined force levels between the occupant and seat belt. In this manner, the restraint force imposed on the occupant can be limited in a controlled manner, thereby providing a certain load limitation characteristics.

Despite these and other improvements to automobile restraint systems, there remains a need to provide a restraint system which is adaptive to differently sized occupants, and in particular which is capable of adapting both the pretensioning and the load limitation characteristics of the restraint system to the occupant.

BRIEF SUMMARY OF THE INVENTION

The present invention provides a restraint system which is adaptive to the size of the occupant, and which adapts both pretensioning and load limitation characteristics to the occupant. The adaptive restraint system generally includes a crash sensor for detecting a potential crash event and an occupant sensor for estimating a relative size of the occupant. A seat belt restrains the occupant in the seat while a retractor has a spindle receiving the webbing of the seat belt. The retractor includes a first force limiting element connected to the spindle. A belt anchorage pretensioner is operatively connected to the seat belt for providing pretensioning of the seat belt. A retractor pretensioner is also operatively connected to the seat belt for providing pretensioning of the seat belt and its activation effect the belt load limits characteristics of the retention. The retractor pretensioner is connected to the spindle of the retractor via a second force limiting element. A controller receives signals from the crash sensor and the occupant sensor, and is operable in at least a first mode and a second mode. In the first mode, the controller effects activation of both the belt anchorage pretensioner and the retractor pretensioner when the occupant is estimated to be above a predetermined size. In the second mode, the controller affects activation of only the belt anchorage pretensioner when the occupant is estimated to be at or below the predetermined size.

According to more detailed aspects, the first and second modes provide different first and second load limitation characteristics, respectively. The first load limitation characteristic is preferably either a high constant load limitation or a degressive load limitation, while the second load limitation characteristic is preferably a low constant load limitation. The second load limitation characteristic is characterized by the first force limiting element only, while the first load limitation characteristic is characterized by both the first force limiting element and the second force limiting element. Thus, activation of the retractor pretensioner has an affect on the first load limitation characteristic, and in particular the first and second force limiting elements are essentially superimposed to characterize the first load limitation characteristic. The retractor pretensioner may be disconnected from the retractor and seat belt upon a predetermined number of rotations of the second force limiting element.

Another embodiment of the present invention provides a method for restraining an occupant of an automobile. The method includes providing a seat belt, a crash sensor, an occupant sensor and a controller receiving signals from the sensors. A belt anchorage pretensioner is provided and is operatively connected to the seat belt for pretensioning a seat belt. A retractor is provided having a spindle receiving the webbing, the retractor including a first force limiting element. A retractor pretensioner is provided operatively connected to the seat belt for pretensioning the seat belt. The retractor pretensioner is connected to the spindle of the retractor via a second force limiting element. The method includes determining a relative size of the occupant based on the occupant sensor. The belt anchorage pretensioner is activated upon sensing a potential crash event. The retractor pretensioner is activated when the occupant is estimated to be greater than or equal to a predetermined size and upon sensing a potential crash event.

BRIEF DESCRIPTION OF THE DRAWINGS

The accompanying drawings incorporated in and forming a part of the specification illustrate several aspects of the present invention, and together with the description serve to explain the principles of the invention. In the drawings.

DETAILED DESCRIPTION OF THE INVENTION

Figure 1:
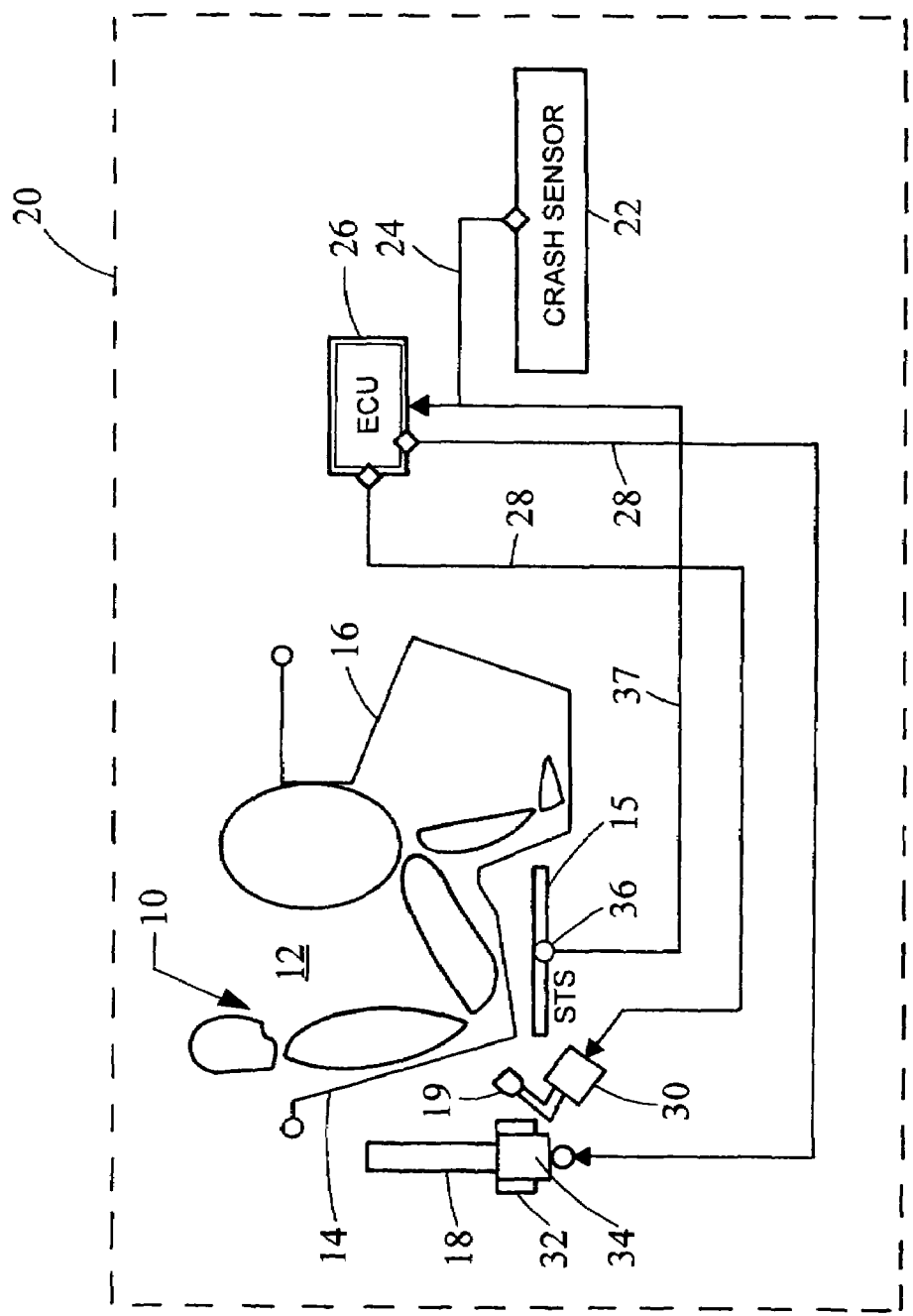
FIG. 1 is a schematic view of an adaptive restraining system constructed in accordance with the teachings of the present invention.

Turning now to the figures, FIG. 1 depicts a schematic view of an adaptive restraint system 20 for an automobile constructed in accordance with the teachings of the present invention. The adaptive restraint system 20 generally includes an occupant 10 positioned in the vehicle cabin 12 and sitting in a seat 14, which could be any of the front or rear seats. The seat 14 is generally adjustable along a seat track 15 which provides translation of the seat 14 relative to the vehicle body 16. A seat belt 18 is provided for retraining the occupant 10 in the seat 14, and is coupled to a buckle 19 which may be operated by the occupant 10 for attaching or releasing the seat belt 18.

The restraint system 20 generally includes a crash sensor 22 sending a signal 24 indicative of a crash event or a potential crash event (in which case the signal 24 would be outputted upon reaching a predefined crash sensitivity). Any crash sensor that is or will be known to those skilled in the art may be readily employed in conjunction with the restraint system 20 of the present invention. An electronic control unit 26 receives the crash signal 24 and controls the vehicle's response to the same. In accordance with the present invention, the electronic control unit 26 sends control signals 28 to various devices, including a first pretensioner 30 and/or a second pretensioner 32. The first pretensioner 30 is preferably any type of belt anchorage pretensioner that is or will be known to those skilled in the art. In FIG. 1, the belt anchorage pretensioner 30 has been depicted as a buckle pretensioner and is connected to the buckle 19 for retracting the same to pretension the seat belt 18 around the occupant 10. One exemplary buckle pretensioner is disclosed in U.S. Pat. No. 6,726,250, the disclosure of which is incorporated herein by reference in its entirety. It will also be recognized that other belt anchorage pretensioners may be employed such as shoulder strap or lap belt anchorage pretensioners; exemplary pretensioners being disclosed in U.S. Pat. No. 6,626,463, the disclosure of which is incorporated herein by reference in its entirely.

A second pretensioner in the form of a retractor pretensioner 32 is specially formed as part of a retractor 34, the retractor 34 being used to wind up the seat belt 18 during normal use. The retractor 34 and retractor pretensioner 32 will be described in more detail herein, although additional details regarding the retractor 34 and pretensioner 32 may be found in German Patent Application No. DE 10344465.3 filed Sep. 25, 2003.

Finally, an occupant sensor 36 is provided for estimating a relative size of the occupant 10. Preferably, the occupant sensor 36 is a simple electrical switch which can be triggered upon translation of the seat 14 along the seat track 15. Specifically, the sensor 36 of the present invention is designed to distinguish between fifth percentile female occupants and fifty percentile occupants, i.e. the 5 percentile small female dummy versus 50 percentile average dummies. Thus, the switch 36 may be located at a predetermined position along the seat track 15 to distinguish between these relative sizes of the occupant 10. While a simple seat track switch 36 is preferred, numerous other occupant sensors that are or will be known to those skilled in the art may be employed, including but not limited to occupant weight sensors, pedal position sensors, occupant position sensors, seat position sensors, low "G" sensors, high "G" sensors and belt displacement or latching sensors. No matter which type of sensor 36 is used, the occupant sensor 36 sends a signal 37 back to the electronic control unit 26 with information indicative of the relative size of the occupant 10.

Figure 2:
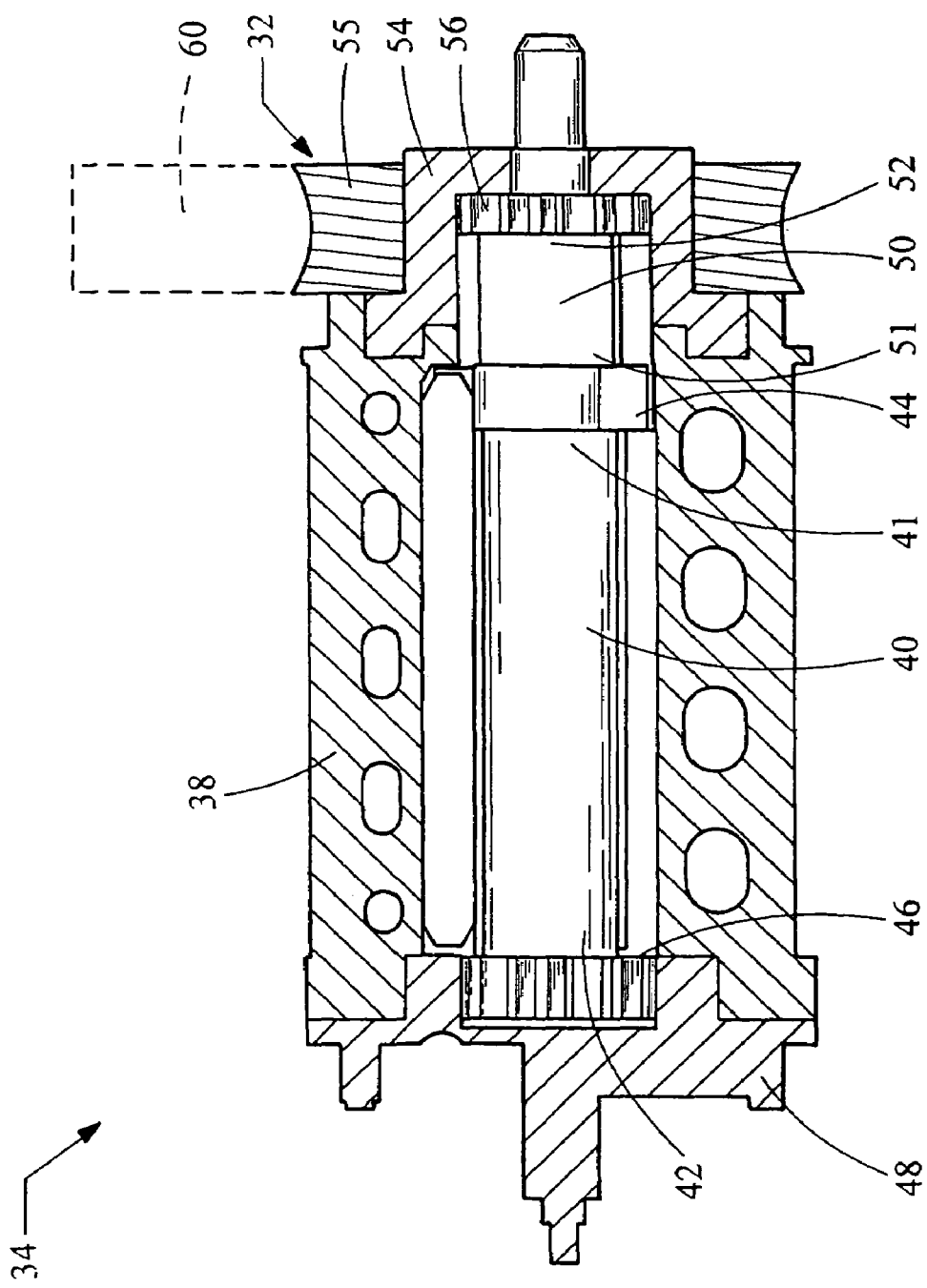
FIG. 2 is a cross-sectional view of a retractor and retractor pretensioner forming a portion of the restraint system of FIG. 1.

Turning now to FIG. 2, a cross-sectional view is depicted of the retractor 34 which includes a retractor pretensioner 32. The retractor 34 generally includes a spindle 38 which is structured to receive the webbing material of the seat belt 18. The retractor 34 further includes a first force limiting element 40, which preferably comprises a torsion rod or torque bar, as is known in the art. It will be recognized that other types of force limiting elements other than torsion rods may be employed in conjunction with the present invention, including sleeves, rings or tubes. The first force limiting element 40 generally includes a first end 41 and a second end 42. The first end 41 is connected to the spindle 38 via a coupling 44. The second end 42 is connected to a profiled head 48 via another coupling 46. A blocking system (not shown) is actuated to prevent rotation of the profiled head 48, and hence rotation of the spindle 38. In this manner, the occupant 10 is restrained in the seat 14 by the seat belt 18. However, the retractor 34 and first force limiting element 40 also provide a low load limitation function in order to limit the restraint force imposed on the occupant 10. Upon reaching a predetermined restraint force, the spindle 38 will begin to rotate and pay out the seat belt 18 by actuation of the force limiting element 40. That is, upon reaching a predetermined force, the torsion rod 40 will twist to allow rotation of the spindle 38 (as well as coupling 44 and first end 41) relative to the profiled head 48 (as well as coupling 46 and second end 42) which is fixed by the blocking element. In this manner, a first load limitation characteristic is provided by the torsion of the force limiting element 40 to allow limited pay out of the seat belt 18 wound on the spindle 38.

Also shown in FIG. 2, a refractor pretensioner 32 is provided for pretensioning the seat belt 18 through the retractor 34. In particular, the pretensioner 32 effectuates rotation of the spindle 38 via a second force limiting element 50. A first end 51 of the force limiting element 50 is connected to the spindle 38 via coupling 44, although it will be recognized that the first end 51 may be directly attached to the spindle 38. The second end 52 of the second force limiting element 50 is connected to an end cap 54 via a coupling 56. The end cap 54 is rotatable relative to the spindle 38, and the friction therebetween is controlled by design as will be discussed further herein. It will be recognized by those skilled in the art that while the first ends 41, 51 of the first and second force limiting elements 40, 50 are located adjacent each other and am rigidly connected to the spindle 38, the second force limiting element 50 and the pretensioner 32 could be connected to the second end 42 of the first force loading element 40, and more specifically connected to the profiled head 48. It will also be recognized that the first and second load limiting elements 40, 50 may be formed out of a single torsion bar wherein the opposing free ends of the bar would be selectively blocked (either via the blocking element or the pretensioner drive) to cause load limitation through the force limiting elements 40, 50. Further, the second force limiting element 50 could be a hollow tube which slides around a reduced diameter end of the torsion rod forming the first force limiting element 40.

A clutch 55 is connected to the end cap 54, while a drive mechanism 60, such an electric motor or other mover, is connected to the clutch 55. Upon determination of a potential crash event, either via the crash sensor 22 or a separate sensor incorporated into the pretensioner 32, the motor 60 drives the end cap 54 through clutch 58 to rotate the second force limiting element 50, which in turn rotates the spindle 38 in a direction to remove any slack from the seat belt 18.

The second force limiting element 50 is preferably designed as a torsion rod, and preferably is capable of transmitting the pretentioning force from the motor 60 without deformation, although this is not required and the second torsion rod 50 may be partially loaded during pretensioning. That is, the second force limiting element is engineered to correspond to the torque level of the pretensioner 34, such that the second force limiting element 50 does not deform or load limit until after pretentioning function. After activation of the pretensioner 32, the end cap 54 is held in place such that any rotation of the spindle 38 to pay out seat belt 18 will require rotation of the coupling 44 (or first end 51 of the second force limiting element 50) relative to the end cap 54 (and coupling 56 and second end 52). When both the profiled head 48 and the end cap 54 of the pretensioner 34 are held in place, a second load limitation characteristic is provided through the combination of first force limiting element 40 and second force limiting element 50, which in this embodiment are superimposed.

Figure 3:
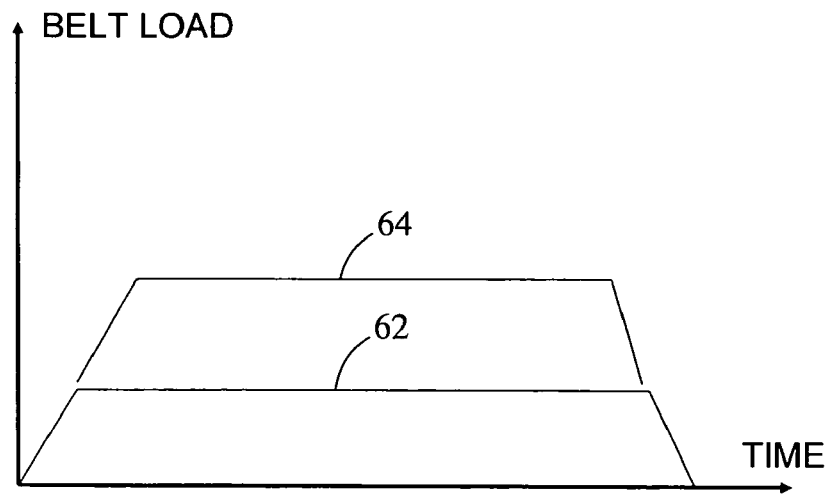
FIGS. 3-5 are graphs depicting belt load over time.
Figure 4:
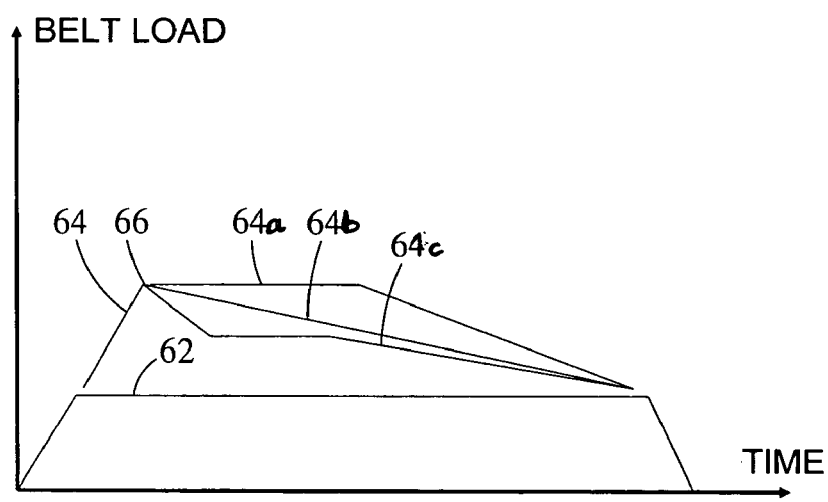

The first and second load limitation characteristics provided by the retractor 34 and pretensioner 32 will now be described with reference to the graphs depicted in FIGS. 3, 4 and 5 which present idealized data. In FIG. 3, lines 62 represents the first load limitation characteristic, where the Y-axis represents belt load while X-axis represents time. When only the first force limiting element 40 is employed for load limitation, the spindle 38 will begin paying out the seat belt 18 upon reaching a relatively low load that is selected by design of element 40. The load limitation characteristic 62 thus represents a low constant load limitation, which is preferably in the range of 2 kN to 3 kN. When both the first and second force limiting elements 40, 50 are activated to control the payout of seat belt 18 by rotation of the spindle 38, a second load limitation characteristic is provided and is indicated by line 64 in the graph of FIG. 3. Thus, the second load limitation characteristic 64 shows a high constant load limitation which is preferably in the range of 5 kN to 6 kN.

It will be recognized by those skilled in the art that by employing two force limiting elements 40, 50 various other load limit characteristics may be achieved. In FIG. 4, the first load limitation characteristic 62 is shown as being the same as that in FIG. 3, as the first force limiting element 40 remains unchanged. However, the second load limitation characteristic 64 is provided with degressive load limitation. In particular, after reaching a predetermined belt load at point 66, the second load limitation characteristic 64 begins to decrease in any one of a number of manners, some of which are shown as lines 64a, 64b and 64c. In order to provide this degressive load limitation, the second force limiting element 50 may be provided with various shapes or constructed of various materials which result in degressive load limits over time.

Figure 5:
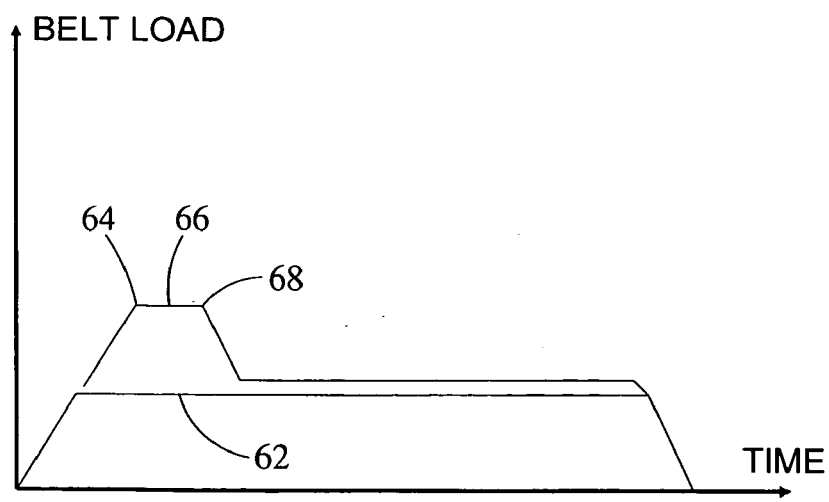

Similarly, and as shown in FIG. 5, the second force limiting element 50 may be superimposed on the first force limiting element 40 until a pre-selected number of spindle rotations are reached. Then, the second force limiting element 50 is decoupled from the spindle 38, preferably by shearing off the coupling 56 or the coupling between force limiting element 50 and the spindle 38, or alternatively by designed failure of the second force limiting element 50. In this manner, the second load limitation characteristic 64 will follow its standard course to a predetermined belt load 66, which will be maintained for a period of time and/or a number of spindle rotations until point 68, at which time the limitation on the belt load will be reduced to a level close to the force level provided by the first load limitation characteristic 62. The difference between the first and second load limitation characteristics 64, 66 beyond point 68 represents the level of friction between the end cap 54 and spindle 38, which may be designed to provide a specific amount of load limitation. In this manner, a degressive load limitation may be provided for the second load limitation characteristic 64 via the second force limiting element 50, which is disconnected upon a predetermined number of spindle rotations. It will also be recognized that a progressive load limitation could also be provided through design of the force limiting elements.

Figure 6:
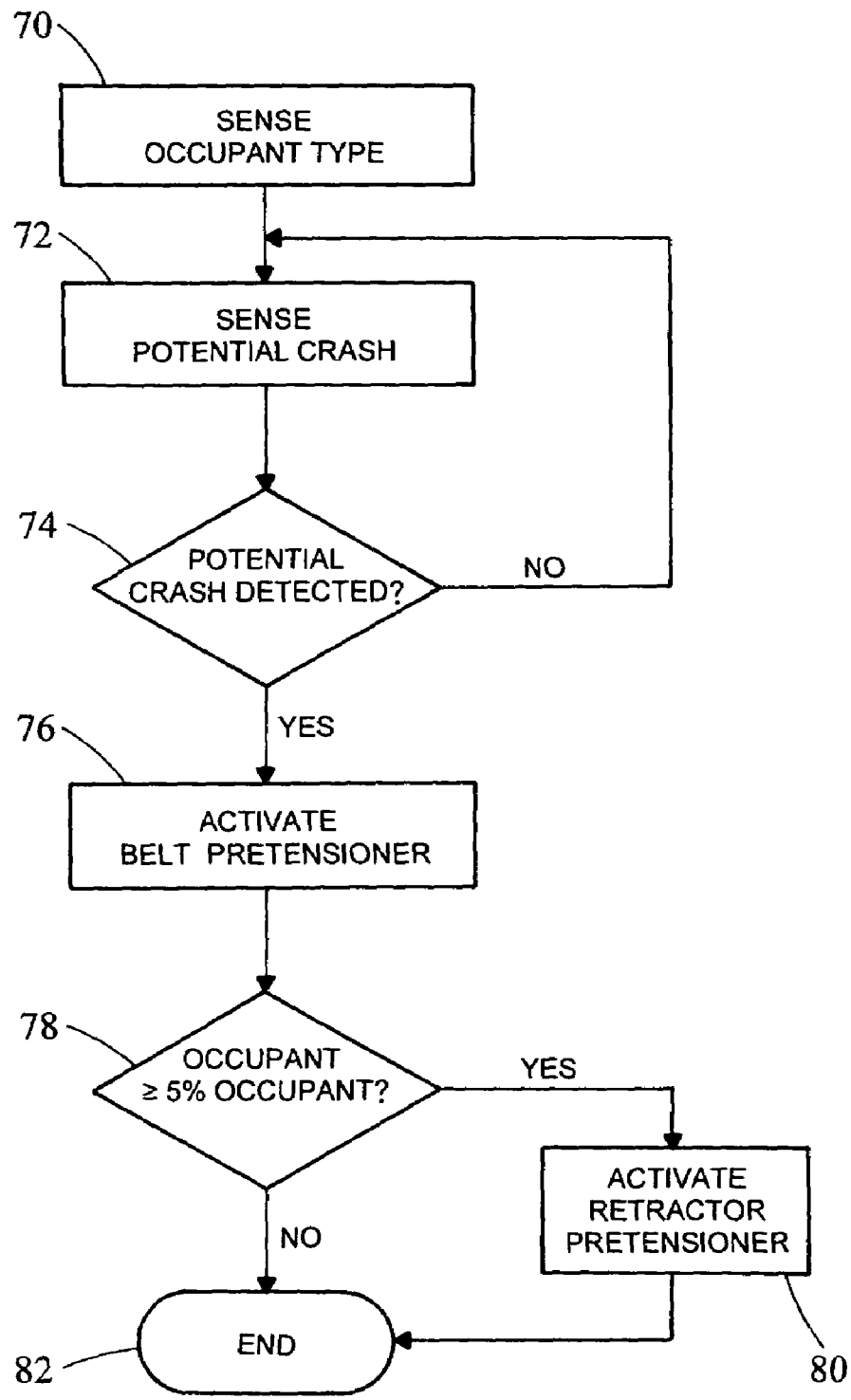
FIG. 6 is a flow chart describing a method of restraint using the system depicted in FIG. 1. is a flow chart describing a method of restraint using the system depicted in FIG. 1.

It will now be recognized by those skilled in the art that the adaptive restraint system 20 of the present invention is capable of providing a method for restraining the occupant 10 in a manner which is adaptive to the particular size of the occupant 10. With reference to FIG. 6, the method includes providing the restraint system depicted in FIGS. 1 and 2, in which the occupant type may be sensed by seat switch 36, as indicated at block 70. The method then flows to block 72, in which a potential crash is sensed via crash sensor 22. At decision block 74, a potential crash is either detected or not detected. When a potential crash is detected, the method activates the belt anchorage pretensioner 30, since this pretensioner 30 is activated regardless of the size of the occupant 10. It is then confirmed at block 78 whether the occupant is greater than or equal to the fifth percentile occupant or other predetermined occupant size. If the occupant is above the predetermined size, the method further activates the retractor pretensioner 32 as indicated at block 80, before the method flows to its end at block 82.

Accordingly, it will be recognized that by activating only the belt anchorage pretensioner 30 when the occupant 10 is sensed to be less than a predetermined level representative of the 5% female occupant, single pretensioning is provided and a first load limitation characteristic is provided through the first force limiting element 40. Since the retractor pretensioner 32 is not activated, the second force limiting element 50 is not activated for this occupant, and a low constant load limitation is provided as a first load limitation characteristic 62.

In the event that the occupant is greater than or equal to the predetermined level and has a relative size in the range of the 50% occupant, the retractor pretensioner 32 will be activated in addition to the belt anchorage pretensioner 30. Thus, double pretensioning will be provided, as well as a second load limitation characteristic which is characterized by both the first and second force limiting elements 40, 50. Depending on the particular embodiment, and specifically the selection and structure of the second fame limiting element 50 and its connections to the end cap 54 and spindle 38, either a high constant load limitation or a degressive load limitation may be provided for the second load limitation characteristic 64.

It will also be recognized by those skilled in the art that the retractor pretensioner 34 and retractor 32 of the present invention reduce or eliminate "locking dip", which as used in the industry describes the phenomena of loss of belt load when the torque load is transferred from the pretensioner to the blocking element which blocks the profiled head to activate the force limiting element. By activating the retractor pretensioner 34, and maintaining the activation of the second force limiting element 50 while the first force limiting element 40 is activated through blocking of the profiled head 48, "locking dip" is substantially eliminated.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. An adaptive restraint system for an automobile having a seat for an occupant, the system comprising:
 a crash sensor for detecting a potential crash event;
 an occupant sensor for estimating a relative size of the occupant;
 a seat belt for restraining the occupant in the seat;
 a retractor having a spindle receiving the webbing of the seat belt, the retractor further including a first force limiting element connected to the spindle;
 a belt anchorage pretensioner operatively connected to the seat belt for providing pretensioning of the seat belt;
 a retractor pretensioner operatively connected to the seat belt for providing pretensioning of the seat belt, the retractor pretensioner connected to the spindle of the retractor via a second force limiting element; and
 a controller receiving signals from the crash sensor and the occupant sensor, the controller operable in at least two modes including,
  a first mode wherein the controller effects activation of both the belt anchorage pretensioner and the retractor pretensioner when the occupant is estimated to be above a predetermined size, and
  a second mode wherein the controller effects activation of only the belt anchorage pretensioner when the occupant is estimated to be at or below the predetermined size.

2. The system of claim 1, wherein the first and second modes provide different first and second load limitation characteristics, respectively.

3. The system of claim 2, wherein the first load limitation characteristic is either a high constant load limitation or a degressive load limitation.

4. The system of claim 2, wherein the second load limitation characteristic is a low constant load limitation.

5. The system of claim 2, wherein the second load limitation characteristic is characterized by the first force limiting element only.

6. The system of claim 2, wherein activation of the retractor pretensioner has an effect on the first load limitation characteristic.

7. The system of claim 2, wherein the first load limitation characteristic is characterized by both the first force limiting element and the second force limiting element.

8. The system of claim 7, wherein the load limitation of the first and second force limiting elements are superimposed to characterize the first load limitation characteristic.

9. The system of claim 7, wherein the second force limiting element provides a degressive profile to the first load limitation characteristic.

10. The system of claim 1, wherein the retractor pretensioner is disconnected from the retractor and seat belt upon a predetermined number of rotations of the second force limiting element.

11. The system of claim 1, wherein the first and second force limiting elements are torsion bars.

12. The system of claim 1, wherein the occupant sensor is a seat track switch sensing translation of the seat past a predetermined position.

13. The system of claim 1, wherein a first end of the first force limiting element is connected to the spindle, and wherein the second force limiting element is connected to either the first or second end of the first force limiting element.

14. A method for restraining an occupant of an automobile, the method comprising:
 providing a seat belt for restraining the occupant, a crash sensor for detecting the potential for a crash event, an occupant sensor for estimating a relative size of the occupant, and a controller receiving signals from the crash sensor and the occupant sensor;
 providing a belt anchorage pretensioner operatively connected to the seat belt for pretensioning of the seat belt;
 providing a retractor having a spindle receiving the webbing of the seat belt, the retractor further including a first force limiting element;
 providing a retractor pretensioner operatively connected to the seat belt for pretensioning of the seat belt, the retractor pretensioner connected to the spindle of the retractor via a second force limiting element;
 determining a relative size of the occupant based on the occupant sensor;
 activating the belt anchorage pretensioner upon sensing a potential crash event; and
 activating the retractor pretensioner when the occupant is estimated to be greater than or equal to a predetermined size and upon sensing a potential crash event, the second force limiting element contributing to the load limitation characteristic of the system only when the retractor pretensioner is activated.

15. The method of claim 14, wherein activation of both the retractor pretensioner and the belt anchorage pretensioner provide a first load limitation characteristic, and wherein activation of only the belt anchorage pretensioner provides a second load limitation characteristic different from the first load limitation characteristic.

16. The method of claim 15, wherein the first and second force limiting elements characterize the first load limitation characteristic.

17. The method of claim 15, wherein the first force limiting element characterizes the second load limitation characteristic.

18. The method of claim 15, wherein the first load limitation characteristic is either a high constant load limitation or a degressive load limitation.

19. The method of claim 15, wherein the second load limitation characteristic is a low constant load limitation.

* * * * *